(12) United States Patent
Schaefer et al.

(10) Patent No.: US 6,832,522 B2
(45) Date of Patent: Dec. 21, 2004

(54) DETECTOR AND SYSTEM FOR INDICATING PRESSURE CHANGE AND METHODS OF USE

(75) Inventors: Garry L. Schaefer, Clackamas, OR (US); Jonathan Alfred Holmgren, Fairbanks, AK (US); Jerome B. Johnson, Fairbanks, AK (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 151 days.

(21) Appl. No.: 10/211,582

(22) Filed: Aug. 5, 2002

(65) Prior Publication Data

US 2002/0194922 A1 Dec. 26, 2002

(51) Int. Cl.$^7$ ................................................ G01L 7/08
(52) U.S. Cl. ........................................... 73/715; 73/718
(58) Field of Search .................................. 73/700–756

(56) References Cited

U.S. PATENT DOCUMENTS

| | | |
|---|---|---|
| 3,665,180 A | 5/1972 | Guillot et al. |
| 3,843,887 A | 10/1974 | Morrison |
| 3,975,641 A | 8/1976 | Morrison |
| 4,047,042 A | 9/1977 | Wada et al. |
| 4,886,088 A | 12/1989 | Ryokai et al. |
| 5,177,471 A | 1/1993 | Horibata et al. |
| 5,287,734 A | 2/1994 | Cuming |
| 5,594,250 A | 1/1997 | Condreva |
| 5,661,464 A | 8/1997 | Bilak et al. |
| 6,119,535 A | 9/2000 | Tambo et al. |
| 6,313,645 B1 | 11/2001 | Brandelik et al. |
| 2002/0060576 A1 | 5/2002 | Tominaga |

OTHER PUBLICATIONS

Taylor, D.W. "Review of Pressure Distribution Theories, Earth Pressure Cell Investigations and Pressure Distribution Data", M H, Cambridge, MA, USA, 11/1945, 184 pp +55 Figs.

State of California, Snow Sensor Evaluation in the Sierra Nevada, California, USA, 1976, 55 pp.

Smith, F. W. & H. S. Boyne, "Snow Pillow Behavior Under Controlled Laboratory Conditions," Colorado State University, USA, pp. 13–22, undated.

Osterhuber, R et al, "Snowpack Snow Water Equivalent Measurement Using the Attenuation of Cosmic Gamma Radiation," Western Snow Conference, Snowbird, UT, USA, Apr. 1998, 7 pp.

Palmer, P., "Estimating Snow Course Water Equivalent From Snotel Pillow Telemetry: An Analysis of Accuracy," Western Snow Conference, Apr. 15–17, 1986, Phoenix, AZ, USA, pp. 81–86.

(List continued on next page.)

*Primary Examiner*—Edward Lefkowitz
*Assistant Examiner*—Jermaine Jenkins
(74) *Attorney, Agent, or Firm*—Earl H. Baugher, Jr.

(57) ABSTRACT

An electronic detector configuration enables the accurate determination of pressure differences in scenarios in which conventional detectors and detector systems introduce inherent thermal inequalities at the interface with their immediate environs. A preferred embodiment of the present invention accurately measures snow water equivalent (SWE) while eliminating the need for fluid-filled pillows that contain environmentally hazardous fluids. By matching the thermal conductivity of)surrounding soil to a detector configuration having an inherently low specific heat, it minimizes effects of differences in thermal conductivity at the snow/soil interface that cause SWE pressure sensor measurement errors. Further, it minimizes thermal effects by keeping soil moisture under the configuration approximately the same as that of surrounding soil. The system is environmentally friendly, has a small footprint, and is inexpensive to implement in arrays coupled to communicators suitable for any number of monitoring and warning functions such as snow avalanche and landslide early warning.

39 Claims, 9 Drawing Sheets

OTHER PUBLICATIONS

Itsorth–Hansen, E. et al. Editors, Snow Engineering: Recent Advances and Developments, Proceedings of the 4th Int'l Conf. on Snow Engineering, Mondheim, Norway, Jun. 19–21, 2000, pp. 45–51.

Beaumont, R.T., "Mt. Huod Pressure Pillow Snow Gage" *Journal of Applied Meteorology*, vol. 4, pp. 626–631, 1965.

Johnson, J. B. "Interim Report on the 1997–98 and the 1998–99 Field Test Performance of the CRREL Electronic Snow Pressure Sensor and Proposal for Sensor Redesign," Ft. Wainwright, AK, USA, Apr. 20 , 1999.

Templeton, J. S., "Analysis for an Embedded Ice Pressure Sensor," *Journal of Energy Resources Technology*, Mar. 1981, ASME, USA, vol. 103, p. 87.

Holister, G.S., "Experimental Stress Analysis, Principles and Methods," Cambridge at the University Press, England, 1967, 1 page.

Ulaby, F. T. & W.H. Stiles, "The Active and Passive Microwave Response to Snow Parameters, 2. Water Equivalent of Dry Snow," *Journal of Geophysical Research*, vol. 85, No. C2, p. 1045, Feb. 20, 1980, USA.

DETECTOR AND SYSTEM FOR INDICATING PRESSURE CHANGE AND METHODS OF USE

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest therein of any patent granted thereon by the United States. This patent and related ones are available for licensing. Contact Sharon Borland at 703 428-9112 or Phillip Stewart at 601 634-4113.

BACKGROUND

The predominant conventional method of measuring snow water-equivalent (SWE) is the fluid-filled snow pillow. Beaumont, R. T., *Mt. Hood Pressure Pillow Snow Gage*, Journal of Applied Meteorology, p. 626–631, October 1965. Engeset, R. V. et al., *Snow Pillows: Use and Evaluation*, Snow Engineering: Recent Advances and Developments, Hjorth-Hansen et al. Eds., Proceedings of the Fourth International Conference on Snow Engineering, Trondheim, Norway, pp. 45–51, 19–21 June 2000. Palmer, Peter L., *Estimating Snow Course Water Equivalent from SNOTEL Pillow Telemetry: An Analysis of Accuracy*, Western Snow Conference, Phoenix, Ariz., Phase Profilometry, 81–86, Apr. 15–17, 1986. Smith, T. W. and H. S. Boyne, *Snow Pillow Behavior under Controlled Laboratory Conditions*, 49$^{th}$ Western Snow Conference, Colorado State University, pp. 13–22, 1981.

Other methods of determining SWE include active and passive microwave techniques and measuring the attenuation of natural gamma rays that pass through the snow cover. Osterhuber, Randall et al., *Snowpack Snow Water Equivalent Measurement Using the Attenuation of Cosmic Gamma Radiation*, Western Snow Conference, Snowbird, Utah, April 1998. Ulaby, Fawwaz T. and William H. Stiles, *The Active and Passive Microwave Response to Snow Parameters:2. Water Equivalent Dry Snow*, Journal of Geophysical Research, Vol. 85, No. C2, pp. 1045–1049, Feb. 20, 1980.

The gamma and microwave methods have limited use at present and even as their use expands they will not replace ground based measurement that can measure SWE in real time. Microwave methods are generally used from satellites, thus they are limited to the period of time that the satellite is over the area of interest. Further, gamma attenuation methods require integration periods of up to four hours. A preferred embodiment of the present invention is an improvement over the microwave and gamma attenuation methods as it can be used to measure real time variations of moisture content, such as SWE, that are needed to forecast flood or landslide potential. Further, to fully appreciate the advantages of a preferred embodiment of the present invention, it is instructive to review the operation of an accepted conventional method of measuring snow water equivalent using a device termed a snow pillow.

The fluid-filled snow pillow is a bladder that is placed on the ground and subsequently filled with fluid, nominally a water-antifreeze mix. The change in pressure as snow accumulates on the bladder is used to determine SWE. The standard snow pillow is about three meters (m) (10 ft) in diameter. Smaller pillows are also used, but introduce larger measurement errors. The snow pillow was developed through a trial and error process that found that snow pillows with diameters smaller than about 3 m were subject to unexplained and inconsistent errors. The snow pillow at times may exhibit inconsistency in measurement. Even the 3 m snow pillows may provide inaccurate SWE measurements, primarily at the beginning of winter or at the transition between winter and spring. The cause of these errors was unknown until recently.

The inventors of the present invention determined that these measurement errors are caused primarily by the difference in thermal properties between the SWE detector and the soil upon which the detector is placed. A secondary influence is the mechanical property of the snow, i.e., elastic modulus and viscosity. Snow pillow measurement errors occur when snow load is shifted from the pillow to the surrounding soil through bridging or from the surrounding soil to the snow pillow. The errors may also occur because the amount of snow on the snow pillow is different than on the surrounding soil.

When thermal properties of a snow pillow, such as thermal conductivity and heat capacity, are different from the soil under and around it, the heat flux through the snow pillow will be different than through the soil. Acknowledging this fact is especially important during periods when the snow/soil interface is at the melting temperature. This difference in heat flux produces a difference in the snowmelt rate on the snow pillow compared to the surrounding soil, causing the snow load to transfer between the detector and the surrounding soil. The snow load will transfer to the snow pillow when the snowmelt rate over the pillow is less than that of the surrounding soil. The resulting error in measurement is termed an SWE over measurement. Conversely, the snow load will transfer from the snow pillow to the surrounding soil, i.e., an SWE under measurement, when the snowmelt rate over the pillow is greater than over the surrounding soil. Errors have the highest probability of occurrence in a) regions of deep snow cover, b) during unusual warming temperatures, or c) during spring.

Deep snow conditions cause the snow/soil interface to increase to the melting temperature by insulating the soil, thus reducing the conduction rate of stored heat in the soil. Warm air temperatures can produce an isothermal snow cover that is uniformly at the melting temperature, thus preventing heat from conducting from the soil, increasing the snowmelt rate at the snow/soil and snow/snow pillow interfaces. In the spring, when the snow temperature is isothermal, i.e., 0° C., or active melting is occurring, the snow/soil interface will be at the melting temperature also.

Snow pillow measurement errors caused by an actual difference in the amount of snow on the pillow compared to the surrounding soil may occur because of a difference in heat flux between the detector and soil, i.e., analogous to the process that produces snow load shifting. Measurement errors may occur in the late autumn and early winter when falling snow melts at a different rate on the soil than on a snow pillow because the heat capacity of the soil is different from that of the snow pillow. The effects of differences in heat storage in the soil and snow pillow disappear once a stable snow cover forms and steady heat flux conditions are established.

A physical theory of SWE detector performance, developed by one of the inventors, indicates that increasing the diameter of an SWE detector decreases the errors caused by differences in heat flux through the detector as compared to the soil. Johnson, J. B., *Interim Report on the 1997–98 and 1998–99 Field Test Performance of the CRREL-Electronic Snow Pressure Sensor and Proposal for Sensor Redesign*, Ft. Wainwright, Ak., 1999. This is why a snow pillow must have a relatively large diameter compared to a moisture or soil stress detector of the present invention to achieve reasonable accuracy. However, increasing the detector diameter does not decrease errors caused by differences in the amount of snow melted over the detector compared to the ground.

Refer to FIG. 7 (Prior Art) depicting the SWE measurement performance of a 3 m snow pillow for a five-year period. The solid markers indicate manually measured SWE and the dashed curve represents snow pillow measurements. The snow pillow and manual measurements have a good agreement for most of the measurement period. However periods of disagreement between manual and snow pillow measurements occur in early Winter '98. Differences are also evident during Winter/Spring '01 and spring transition periods of 1998 and 2001. In general, the snow pillow accurately measures SWE. However, during 1998–99, the snow pillow over measures SWE during the early part. This may be the result of differences in heat capacity between the snow pillow and the soil as shown in FIG. 7A. Also, there are a number of periods when the snow pillow under measures SWE as shown in FIG. 7D for Winter/Spring '01.

A number of U.S. patents propose various solutions to measuring SWE. U.S. Pat. No. 3,665,180, *Method and Apparatus for Measuring the Water Content of a Snowpack*, to Gullot et al., May 23, 1972 uses two vertical tubes to locate a standard γ-ray source. The source and a detector are moved simultaneously by a step-by-step motor, each step occurring after a pre-specified number of pulses have been delivered to the detector. The time interval between successive steps is proportional to the water content of the snow therebetween.

U.S. Pat. No. 3,843,887, *Self-Calibrating Isotopic Precipitation Measurement Gage*, to Morrison, Oct. 22, 1974, uses an isotopic source of γ-rays transmitted through attenuating material to a given point at which detectors are located. Processors associated with the detectors establish a continuously calibrated density measurement from which the SWE is calculated.

U.S. Pat. No. 4,047,042, *Method of Determining the Water Equivalent Depth of Snowfall Using Neutrons of Cosmic Rays*, to Wada et al., Sep. 6, 1977, provides a method of determining SWE from the count of survival neutrons of cosmic rays that have passed through a pre-specified depth of snow.

U.S. Pat. No. 5,594,250, *Method for Detecting Water Equivalent of Snow Using Secondary Cosmic Gamma Radiation*, to Condreva, Jan. 14, 1997, provides a remotely activated, battery-powered system that transmits SWE measurements derived from the attenuation of secondary γ-radiation.

U.S. Pat. No. 6,313,645 B1, *Method of Determining the Volumetric Proportion of Liquid Water and the Density of Snow and a Device for Carrying Out the Method*, to Brandelik, Nov. 6, 2001, describes a probe having three parallel electrical conductors that are energized in pairs. Knowing dielectric coefficients, based on probe-specific data and known coefficients of snow and water and energizing at differing frequencies, volumetric parts of water, snow, and air in the location are determined using the law of mass conservation.

Some patents describe methods of determining water content using thermal sensors. U.S. Pat. No. 4,886,088, *Method and Apparatus for Measuring Water Content*, to Ryokai et al., Dec. 12, 1989, describes a method for measuring thermal conductivity of a target and comparing that with known data to establish a threshold indicating sufficient water content in the target.

U.S. Pat. No. 5,287,734, *Thermal Sensor*, to Cuming, Feb. 22, 1994, details a method for determining soil moisture levels using thermal diffusivity techniques. It uses a heated sensor and a reference sensor together with a comparator circuit to determine relative moisture based on comparing measurements from the two sensors.

Other patents describe systems used to provide warning of geodetic perturbations. U.S. Pat. No. 5,177,471, *Landslide Detecting Apparatus Having Improved Optical Unit*, to Horibati et al., Jan. 5, 1993, describes an optical device that warns of impending landslides. The apparatus responds to pressure changes in the earth's crust by shading parallel beams of light upon movement of the earth's crust.

U.S. Pat. No. 5,661,464, *Snow Pack Stability Monitor*, to Bilak et al., Aug. 26, 1997, provides a probe consisting of a movable and stationary part. When the movable part moves in relation to the stationary part, a motion detector senses this and telemeters details of the movement to a central station.

U.S. Patent Application Publication No. 2002/0060576 A1, by Tominaga, May 23, 2002, details an active electrical probe consisting of four electrodes inserted into the soil. Soil conductivity is measured under known conditions and changes in conductivity are sensed by the apparatus and data sent to a central station to effect appropriate warning.

Patents have issued on underground water level sensors, deployed in arrays, an example of which is U.S. Pat. No. 6,119,535, *Underground Water Level Sensing Unit and Ground Monitoring System Using the Same*, to Tambo et al., Sep. 19, 2000. Each sensing unit in the array employs a gyro-sensor that responds to an external force such as movement of a snowpack or topsoil. The data thus detected are telemetered to a central station for initiating appropriate warnings.

As can be inferred from the above descriptions, the embodiments proposed for use with the present invention are much simpler and less expensive to implement, while yielding wholly satisfactory results.

A preferred embodiment of the present invention accurately measures SWE while eliminating the need for fluid-filled pillows that contain environmentally hazardous fluids. It also minimizes effects of thermal processes at the snow/ground interface that cause SWE pressure sensor measurement errors. Further, it minimizes thermal effects by keeping soil moisture under the detector the same as in the soil immediately surrounding the detector, matching the thermal conductivity of the SWE detector with the surrounding soil while exhibiting a relatively low specific heat.

SUMMARY

In general, a system is provided that accurately determines relative pressure at a boundary between first and second media. It uses at least one detector incorporating structure for mounting and enclosing at least one sensor such that at least a portion of the structure is in contact with one of the two media of interest for which the detector is interposed between. This structure enhances the thermal stability of the detector as does a cover disposed over the detector and positioned between the detector and the one media that does not contact the detector. This system maintains thermal conductivity comparable to its surrounding environs. Sensors used with the system to measure pressure may be: load cells, strain gauges, displacement sensors using lasers that measure deflection, displacement sensors using capacitance to measure deflection, and combinations thereof. Further, the detector has a low aspect ratios i.e., its thickness is less than about three percent of its longest dimension. Materials having low specific heat values of less than about 0.1 cal/gm-K at 20° C. are used in its construction. These low specific heat materials may be: aluminum, stainless steel, low specific heat synthetic material, low specific heat plastics, and combinations thereof. Further the detector may include a layer of heat diffusing material internal thereto that may be any of: elastomeric material, metal, polymer foam, a honeycomb configuration fabricated from metal, a honeycomb configuration fabricated from a synthetic material, and combinations thereof. To improve performance the detector may comprise or be covered with a material that assists in matching its thermal response to its surroundings. The material used for the cover may be any of: a moisture impermeable membrane, a moisture permeable membrane, a synthetic material, a layer of soil of approximately 5 cm thickness, and combinations of the above. The structure of the detector is such that it enables an effective Young's Modulus at least twenty-five percent greater than the Young's Modulus of its surrounding environs.

In summary, a preferred embodiment of the present invention provides a detector that approximately matches its thermal response to the thermal response of its surrounding environs, thus facilitating accurate measurement of pressure difference between two abutting media. This is particularly suited to for establishing accurate estimates of snow water equivalent.

Another embodiment envisions a monitoring system that provides accurate estimates of relative pressure from data collected at a boundary of first and second media. It incorporates at least one detector having a structure for mounting and enclosing at least one sensor so that at least a portion of the structure is in contact with one of the media and interposed between them. The structure itself enhances the thermal stability of the detector which is further augmented by the addition of a cover, disposed over the structure so as to be positioned between the structure and the media that does not contact it. To facilitate use of the data collected by the detector, there may be provided a data transceiver associated with the detector for communicating data and receiving information that may be used to control the handoff of data; a data collector for receiving the data at a place possibly remote from the detector; and a processor for manipulating the data for further uses, such as planning, warning, or input to scientific studies.

In one embodiment, an electronic detector system determines the pressure of overlying material, such as snow or soil overburden, and may be used to determine the amount of moisture stored therein, e.g., the snow water equivalent (SWE). The detector system minimizes measurement errors that occur when thermal properties of the detector, i.e., the sensor and its housing, itself are different from those of its surrounds. Primary features of the detector are:

a thin, wide geometry, i.e., a low aspect ratio, to minimize stress concentration effects associated with detector geometry and differences in the mechanical properties of the detector and its surrounding environment. Taylor, Donald W., *Review of Pressure Distribution Theories, Earth Pressure Cell Investigations, and Pressure Distribution Data*, prepared for the U.S. Army Corps of Engineers under Contract No. W22-015 eng-185, Massachusetts Institute of Technology, Cambridge, Mass, 1945;

inherent low heat capacity to minimize buildup or storage of heat;

thermal conductivity close to that of its environs to minimize differences in heat flow through the detector compared to the adjacent environs;

a membrane cover, for use with an impermeable version, that is at least three times the diameter, or width of the impermeable detector, to maintain appropriate soil moisture and soil thermal conductivity around the detector;

an alternative permeable design to allow water to flow through the detector to the underlying environs to maintain appropriate soil moisture and thermal conductivity in the immediate vicinity of the permeable detector;

a heat diffusing layer above the detector to evenly distribute heat or cold over and around the detector to minimize differences in heat flux through the detector as compared to immediately surrounding environs;

a thin profile to reduce the influence of any thermal conductivity differences between the detector and its immediate environs; and a detector incorporating an electronic transducer that eliminates a need for conventional fluid-filled pillows and associated plumbing.

The detector's relatively low specific heat limits the amount of heat capable of storage in the detector. This minimizes the differential rate of snowmelt on the ground compared to the SWE detector in early winter before snow cover is established.

Assuring the thermal conductivity of the detector approximates the thermal conductivity of its environs, e.g., approximately 0.8–2 watts/Kelvin-meter (W/K-m) for soil, results in comparable heat flux through the detector and its surrounding environs. For example, snow will melt at about the same rate whether it is over the detector or over its immediate surrounding environs. This minimizes the transfer of snow load onto or off of the detector, reducing measurement errors.

Using a waterproof membrane for an impermeable, or non-perforated, detector to maintain approximately the same moisture in the environment under and around the detector is accomplished by adding a cover membrane with a diameter or width at least three times that of the detector plates. This keeps the thermal conductivity of the environment under and around the detector equivalent to that of the detector. Using an alternative design having permeable, or perforated, top and bottom load support plates allows moisture to flow through the permeable detector to maintain comparable moisture under and around the detector, thus maintaining comparable thermal conductivity of the environment adjacent the detector. This is especially important during spring runoff when the amount of snowmelt water varies diurnally. The thermal conductivity of the soil is a strong function of its water content and maintaining comparable water content of the environment under and around the detector assures comparable conductivity.

Using a thin detector, e.g., <2.5 cm (1 in.), improves performance since the small thickness of the detector decreases the impact of the difference between the thermal conductivity of the detector and its surrounding environment. The limitation on detector thickness is a factor of the technology employed as well as cost.

Employing a heat diffusing layer over the detector that extends beyond the edge of the detector by at least the diameter or width of the detector minimizes any difference in heat flux between the detector and its surrounds. The diffusing layer may be soil, a synthetic, or the impermeable membrane used with the impermeable detector configuration.

Features of the detector that are important to its performance, but are not particularly novel since they are well known from soil stress sensor theory or previous snow pillow experiments are:

To maintain a small aspect ratio (i.e., the ratio of the detector thickness to its width or diameter). This ensures that the detector's stress concentration factor has a magnitude close to one and that differences in the elastic modulus of the detector compared to the soil and snow have little effect on the measurement.

To construct the detector with an effective elastic (Young's) modulus that is significantly higher than the surrounding material (snow). This ensures that the detector's deformation is related to the snow pressure (stress sensor) rather than the snow deformation (strain sensor).

To use electronic methods to determine the SWE, instead of fluid-filled pressure sensors. Electronic methods include load cells, strain gauges, displacement sensors (laser, capacitance, etc.). Electronic measurement methods eliminate the possibility of environmentally hazardous antifreezes from entering the environment.

To construct the detector with a diameter designed to minimize SWE errors associated with different snow melt rates on the detector and surrounding soil. This diameter depends on how well the thermal properties of the detector are matched to the soil. If they are well matched, the detector diameter can be quite small. If, however, the detector's thermal properties are not well matched to the soil, as is the case for fluid-filled snow pillows, the diameter, or width, may need to be quite large. For example, total diameter of CRREL test SWE detector is 1 m (3.3 ft) with an active load area of only 0.46 m (1.5 ft). The diameter of a standard snow pillow is typically 3 m (10 ft).

The SWE electronic detector is an improvement over the fluid-filled snow pillow because the invention uses electronic load measuring methods, is smaller and lighter than the snow pillow, and accommodates the physical effects of thermal processes that affect SWE measurements. It operates with significantly lower measurement error than a snow pillow because it is thermally matched to the surrounding soil. As a result, the detector may be packaged in a smaller housing than the fluid-filled snow pillow while recording SWE with high accuracy. It has a low heat capacity compared to the snow pillow because of the materials used, e.g., aluminum, other metal, or low heat capacity synthetics, as compared to the snow pillow with its high heat capacity fluid-filled bladder. Differences in the thermal conductivity of the surrounding soil and the detector are minimized by matching the thermal conductivity of the detector to the midrange value of thermal conductivity for soils, i.e., approximately 0.8–2 W/K-m, since soil thermal conductivity depends strongly on its moisture content. This is accomplished by constructing the detector with either perforated top and bottom plates or covering the detector and the surrounding soil with an impermeable membrane that has a diameter at least three times greater than the solid (unperforated) detector plates. Both configurations maintain the soil moisture near the detector at near constant values, reducing the variation of thermal conductivity in the soil near the detector compared to the soil farther away. The permeable detector has the added advantage of keeping soil moisture levels near their natural levels. This cannot be done using impermeable detectors such as a snow pillow. In addition, the SWE electronic detector makes measurements electronically so it does not require the extensive plumbing needed to deploy a fluid-filled snow pillow. Finally, there is no possibility of leaking antifreeze into the soil.

The electronic SWE detector responds instantly to changes in SWE. This capability is useful for making stream runoff estimates, and is an improvement over the gamma ray attenuation method that requires a three to four hour averaging time for measurements.

The detector measures the SWE of wet or dry snow. This is a capability not available with microwave methods that are useful only with dry snow. Compared to any of the conventional methods, the detector is less sensitive to changes in thermal conditions of the soil.

Additionally, the perforated configuration of the electronic SWE detector may be used in applications where maintaining a water flow through soil is important or if there is a need for a separate measurement of the overburden soil load from fluid pressure in the soil.

DETAILED DESCRIPTION

Figure 1:
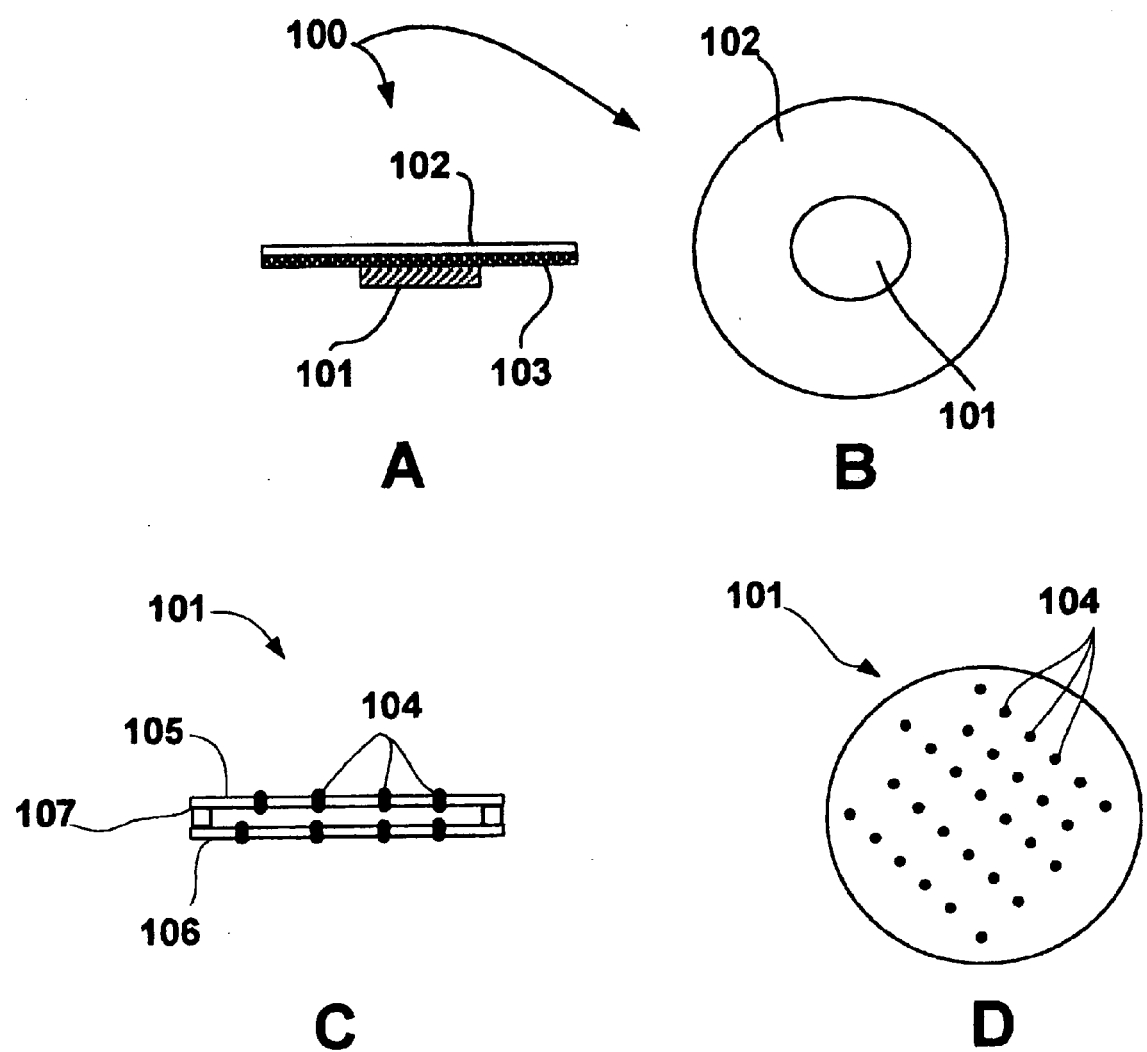
FIG. 1 depicts one example each of an installation of an impermeable and a permeable pressure detector of the present invention, each in both a top and elevation view.

Refer to FIGS. 1A and 1B. A detector system 100 of the present invention is shown in side (FIG. 1A) and top view (FIG. 1B). The detector 101 is covered with a membrane 102 at least three times its diameter (or width if a square or rectangular configuration). As an option the system may incorporate a layer 103 of heat diffusing material between the membrane 102 and the detector 101 to facilitate "equalization" of heat transfer to the immediate environs of the detector system 100. Equalization means that heat transfer to an overburden layer, e.g., snow, immediately above the detector system 100 from the soil below the detector 101 is comparable to heat transfer from the soil to the overburden in areas adjacent to the detector system 100.

Refer to FIGS. 1C and D. A preferred embodiment of the present invention, a detector 101, is constructed using a top plate 105 and a bottom plate 106 separated by a support framework 107. The plates 105, 106 may be any shape, but circular and square shapes are most common and practical.

To operate as a snow water equivalent (SWE) detector 101, the detector 101 is placed on the ground with the bottom plate 106 touching the ground so that snow is allowed to collect on the top plate 105. The plates 105, 106 may be solid or perforated with holes 104.

Refer to FIGS. 2A and B. The inner chamber (not separately shown) of a detector 101 of the present invention that employs solid (non-perforated) plates 210, 211 is sealed to make it watertight. The inner chamber may be kept at atmospheric pressure by connecting an air pressure relief tube 203 to a watertight connector (not separately shown) on the detector 101 and running the tube 203 to a protected instrument hut (not separately shown). In addition, with solid plates 210, 211 a water impermeable membrane 102, covers the detector 101 and surrounding soil. This membrane 102 keeps the moisture content of the soil under the detector 101 similar to that in the surrounding soil. This is important during spring runoff when water amounts from snowmelt exhibit a significant diurnal variation that may produce a large diurnal variation in soil thermal conductivity. This leads to possible measurement error.

A detector 101 constructed with perforated top 105 and bottom 106 plates as in FIG. 1D allows water to flow through it to keep the moisture content of the soil under the detector 101 similar to the moisture content of surrounding soil. Thus, for this embodiment, neither a membrane cover 102 nor a pressure relief tube 203 is needed since the detector 101 itself is open to the atmosphere. However this embodiment may employ a water permeable membrane 102 covering to allow water to enter the detector while preventing entry of dust as shown in FIG. 1B.

Refer to FIGS. 2A and B. A detector 101 may employ load cells 201 to measure the snow load on its center region. The thermal conductivity of the detector 101 may be matched to the surrounding soil by flexible thermal conductivity straps 202, such as aluminum or copper braded wire or sheet, between the inner and outer part of the top plate 105 and between the top plate 105 and bottom plate 106. A heat diffusing layer 103, e.g., soil, a synthetic, and a moisture impermeable membrane may be placed on the detector 101 to further improve thermal matching with its environs.

Figure 5:
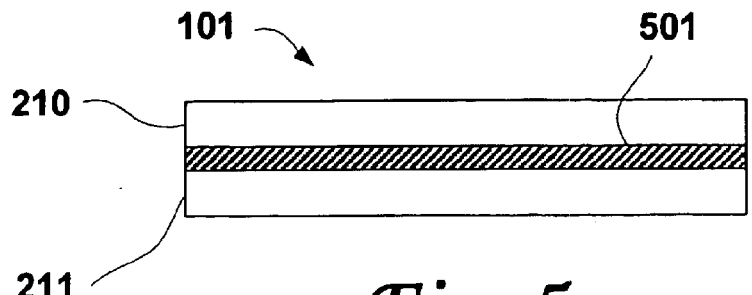
FIG. 5 illustrates a pressure detector in which the top and bottom plates rest on an elastic foam or honeycomb material.

The detector 101 may be constructed from materials having a relatively low specific heat, e.g., aluminum, stainless steel, or synthetic material such as low specific heat plastics. Specifically, the inner 204, outer 205, and bottom 206 mounting bars should be composed of these types of material. Refer to FIG. 5. The top 210 and bottom 211 plates of the detector 101 may be separated by a layer 501 of metal, polymer foam, or a honeycomb material made from metal or a synthetic.

The pressure of snow upon the detector 101 may be determined by measuring the deflection at the center of a top plate 105, 210 of known area or by measuring the deflection of a support member 107 between a top plate 105, 210 and a bottom plate 106, 211 e.g., a load cell 201 or pressure sensitive membrane (not separately shown). The pressure may also be determined by measuring the change in distance between the top 105, 210 and bottom 106, 211 plate using any number of methods, e.g., linear variable transducers, laser or ultrasonic distance rangers, or capacitance methods. Fraden, Jacob, *AIP Handbook of Modern Sensors: Physics, Designs, and Applications*, American Institute of Physics, New York, N.Y., 552p., 1993.

Figure 3:
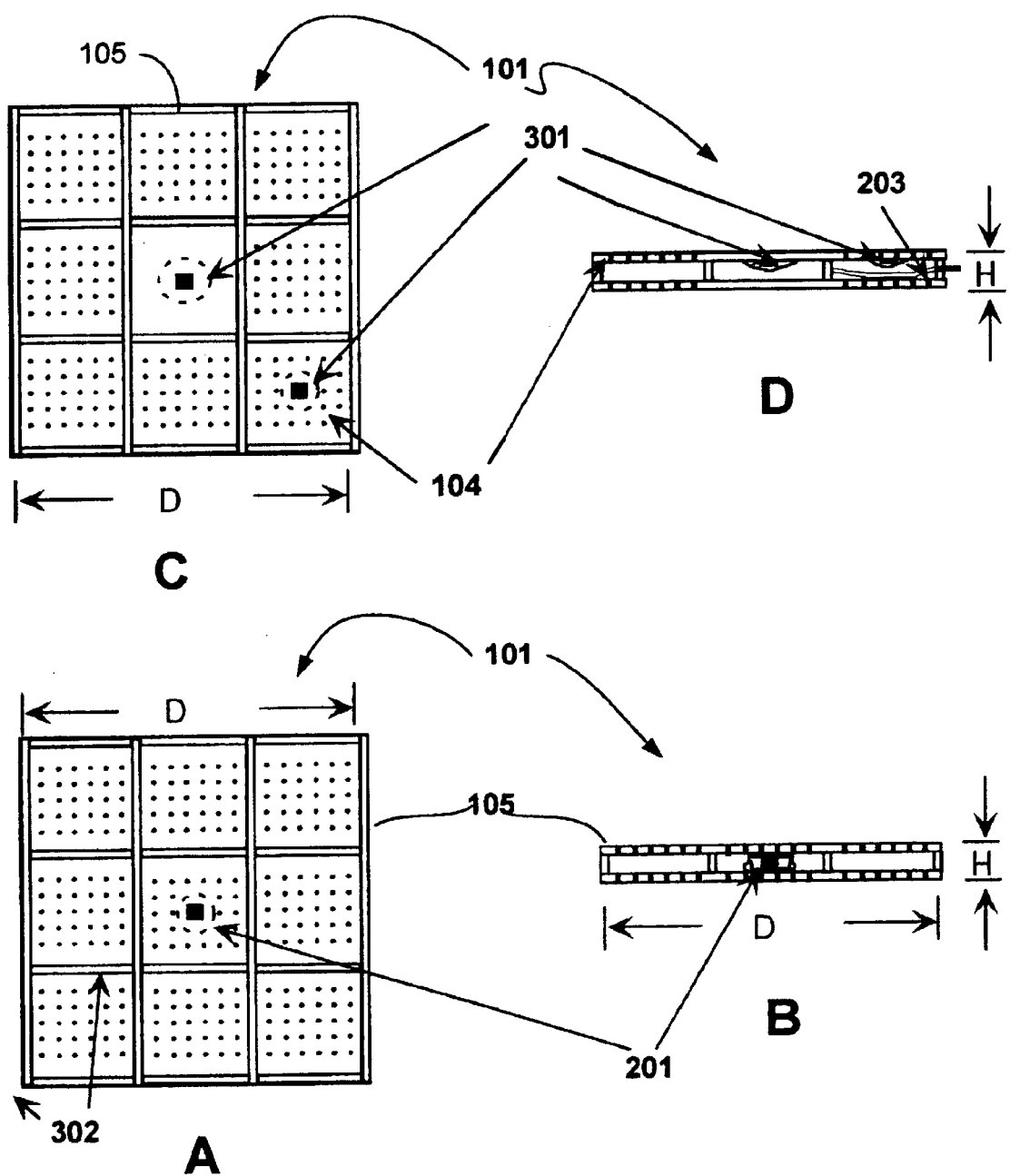
FIG. 3 is an example of permeable rectangular segmented pressure detectors in which a center panel and the lower right panel measure snow load independently.

Refer to FIG. 3. Three detector design variations are presented as examples of embodiments of the present invention. A first detector design depicted in top and side views of FIGS. 3A and 3B respectively, consists of a perforated top plate 105 segmented into sections 302 in which only the center part of the detector 101 detects snow pressure. The outer area of the detector 101 is insensitive to the pressure of snow upon it. This design is used to reduce the influence of stress concentrations that occur at the edge of the detector 101 due to differences between the elastic modulus of the detector 101 and the snow, as well as the detector's geometric dimensions. Metge, M., et al., *On Recording Stresses in Ice*, International Association of Hydraulic Research Third International Symposium on Ice Problems, pp. 459–468, 1975. Taylor (1945). Templeton, J. S., *Analysis for an Embedded Ice Pressure Sensor*, ASME Journal of Energy Resources Technology, Vol. 103, pp. 87–95, March 1981).

Figure 2:
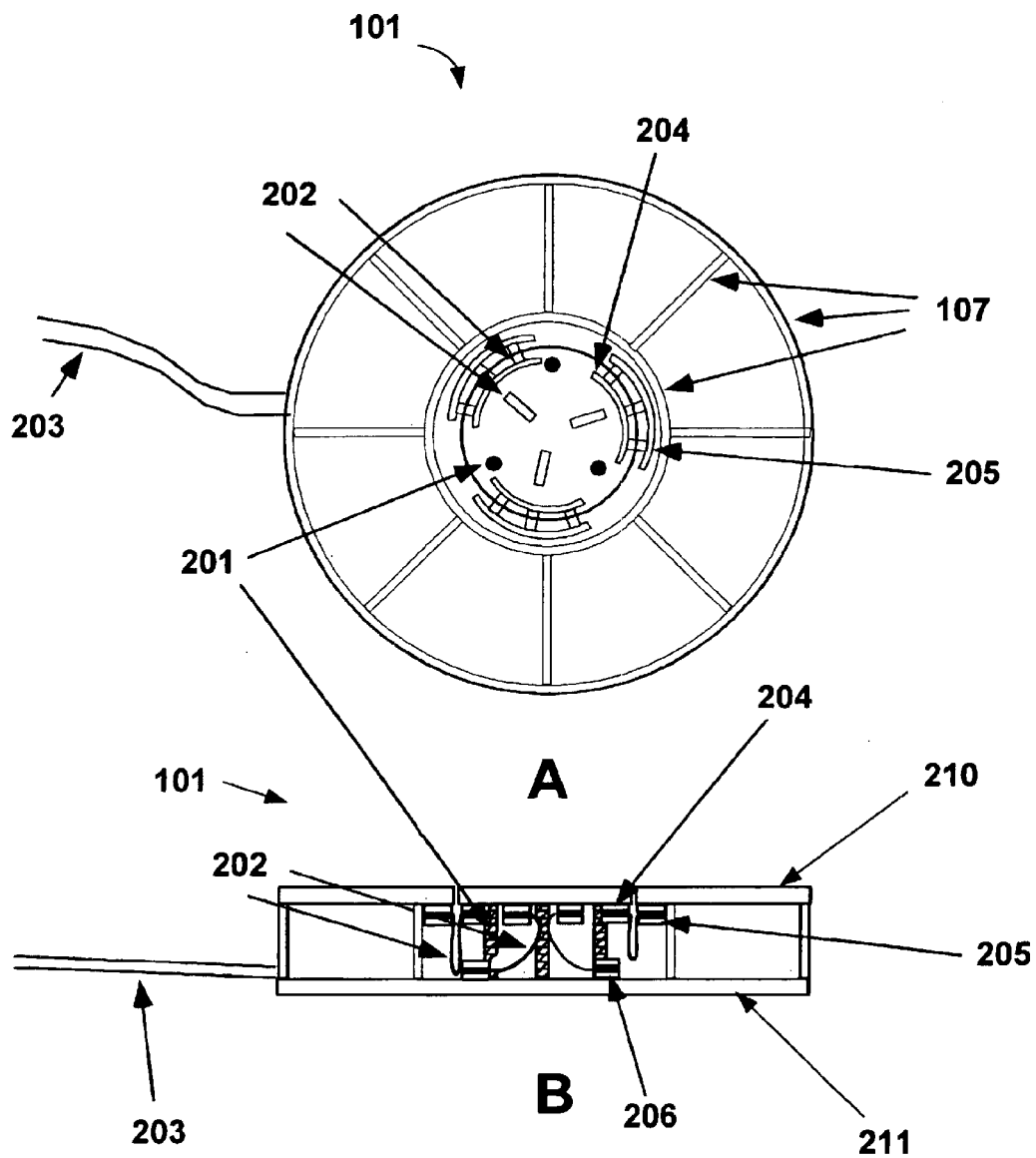
FIG. 2 shows a segmented pressure detector with an outer region that is insensitive to pressure and a center pressure sensitive area, employing load cells, that is separate from the outer region.

The detector 101 shown in FIG. 2 is circular, but any configuration having a thickness much less than other dimensions, such as the rectangular "planar" configuration of FIG. 3, may be used. Refer to FIG. 1 and FIG. 3 depicting a detector having segments 302. Pressure is measured by either a load cell 201 between the top 105 and bottom 106 plates of the center section of a first design of the detector 101, or by a strain gauge 301 located on the underside of the top plate 105 of a segmented detector 101 as in FIG. 3C. The support framework 107 acts as a thermal path to match the detector thermal properties with the soil thermal properties and to isolate the plates' deflection-pressure response behavior from each other. The detector 101 in FIG. 3C and 3D uses strain gauge technology and that in FIG. 3A and 3B uses load cell methods.

Figure 4:
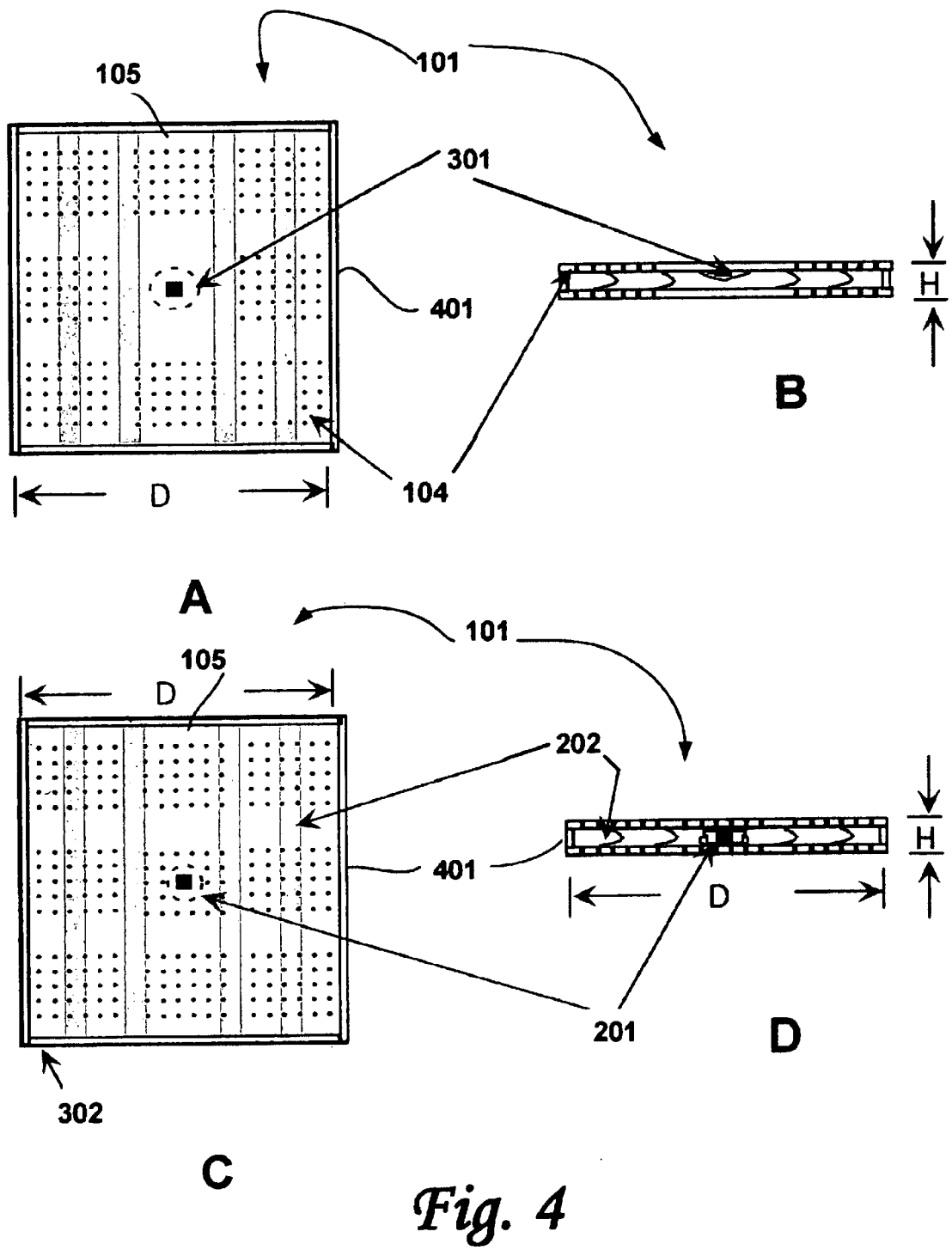
FIG. 4 depicts permeable full-surface rectangular pressure detectors with flexible conductivity straps or sheets that employ either strain gauges or load cells.

Refer to FIGS. 1 and 4. A second design has a top 105 and bottom 106 perforated but unsegmented plate supported by its edges 401 on a frame 107 with either a load cell 201, such as the TRANSDUCER TECHNIQUES low profile load cell LBC-500, between the plates 105, 106 as shown in FIGS. 4C and 4D, or strain gauges 301, such as the MICROMEASUREMENTS EK-03-250MQ-10C 1.0 K-ohm strain gauge, attached to the bottom of the upper plate 105 located at the center of the detector 101 as shown in FIG. 4A and 4B. Holister, G. S., *Experimental Stress Analysis, Principles and Methods*, Cambridge University Press, London, 321p., 1967.

Refer to FIGS. 3B, 4B, and 5. A third type of detector 101 consists of a top plate 105, 210 attached to the bottom plate 105, 211 by "springs" (not separately shown) or compressible material 501, such as elastomeric foam or honeycomb, or a combination of springs and compressible material 501, that deflects when snow accumulates on the detector 101. The springs may be load cells 201. The detector 101 may be designed as a segmented detector as in FIG. 3 or a fill-surface detector 101 with impermeable 210, 211 plates as in FIG. 5 or permeable 105, 106 plates as in FIGS. 1C and 1D. The primary difference between the detector 101 of FIG. 1 and those in FIGS. 3 and 4 is that pressure measured with the detector 101 of FIG. 1 is determined by measuring the change in length, H, between the upper 105 and lower 106 plates.

Thermal matching of the detector 101 with the surrounding soil may be achieved by adjusting thermal conductivity of the elastic layer 501. For example, the density of an elastic metal foam is related to its conductivity and the thickness and size of a honeycomb web determine its thermal conductivity. By adjusting foam density and honeycomb structural dimensions both the sensitivity and thermal conductivity of a detector 101 may be adjusted.

Deflection of springs not comprising load cells may be determined by strain gauges 301 or tilt meters (not separately shown) mounted on the springs as the springs deflect through bending.

Alternatively, spring deflection may be determined using linear variable displacement transformers, laser or capacitance displacement transducers, or other methods of measuring deflection (none separately shown) as described in Fraden (1993). All three detector types may be built with either watertight pressure relieved chambers or with perforated top 105 and bottom 106 plates.

Figure 6:
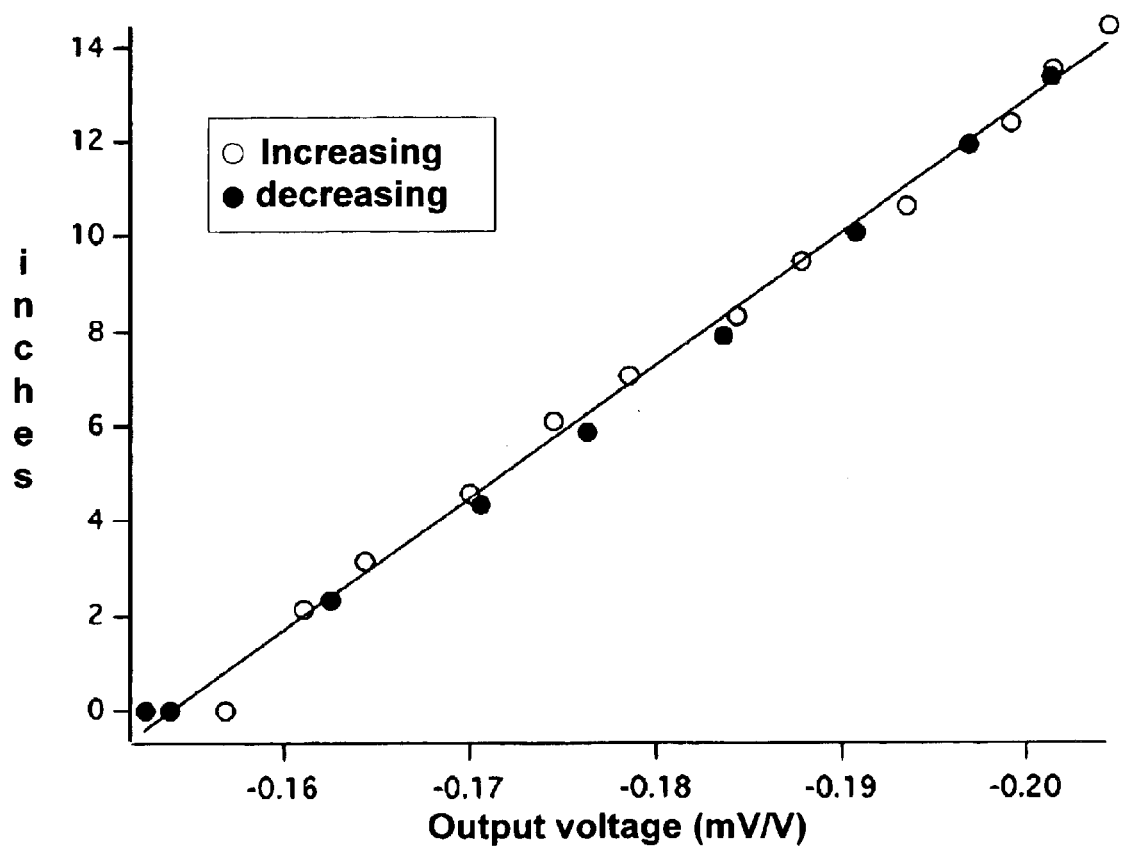
FIG. 6 is an SWE-output voltage calibration curve for the detector of FIG. 2.
Figure 7:
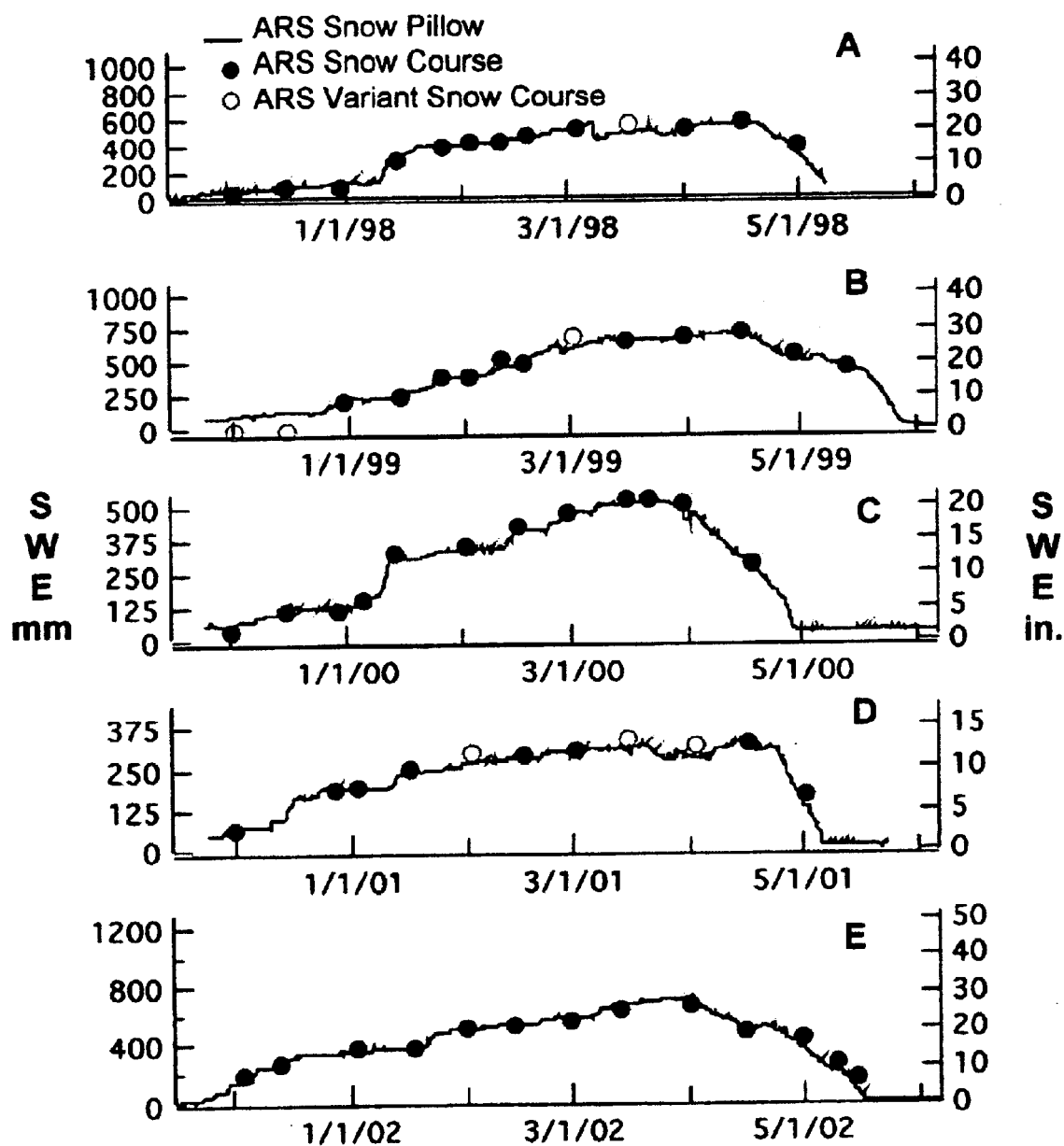
FIG. 7 compares SWE pressure detector measurements of an U.S. Dept. of Agriculture Research Station (ARS) snow pillow to manually measured SWE of an ARS snow course for four winter seasons.

Refer to FIG. 6. Correlating the output of a pressure detector 101 used to take SWE measurements with actual SWE values is done by calibrating using a known water pressure. By placing a watertight container (not separately shown) around the detector 101, its output may be taken as a function of water level. Results of calibration demonstrate that output from the detector 101 is a linear function of water pressure. The high degree of linearity shown in the calibration of this configuration when taken in both directions, i.e., pressure increasing and decreasing monotonically, also applies to other configurations of the present invention.

EXAMPLE I

A preferred embodiment of the present invention incorporates features to overcome or minimize SWE measurement errors caused by differences in the thermal properties between a detector 101 and the soil surrounding it. Incorporating a thin profile for the detector 101, i.e., nominally less than 2.5 cm (1 inch), reduces the effect of differences in thermal conductivity between the soil and detector 101. By reducing the SWE detector thickness, $\Delta h$, the effective thermal conductivity, $k_{\mathit{eff}}$, of the detector 101 resting on a soil element of thickness, $\Delta x$, becomes very close to the same value as the thermal conductivity of the soil, $k_g$, as mathematically represented by $$k_{\mathit{eff}} = \frac{k_{sn}k_g\left(1+\frac{\Delta h}{\Delta x}\right)}{k_{sn}+k_g\frac{\Delta h}{\Delta x}} \xrightarrow[\lim \frac{\Delta h}{\Delta x}\to 0]{} k_g \qquad (1)$$

where $k_{sn}$ is the thermal conductivity of the detector 101 and the soil element thickness, $\Delta x$, is the thermally active layer of soil with uniform thermal conductivity. Eqn. (1) was derived by assuming that the soil and detector 101 are in series, i.e., a detector 101 of thickness $\Delta h$ rests on top of a soil element of thickness $\Delta x$.

Figure 8:
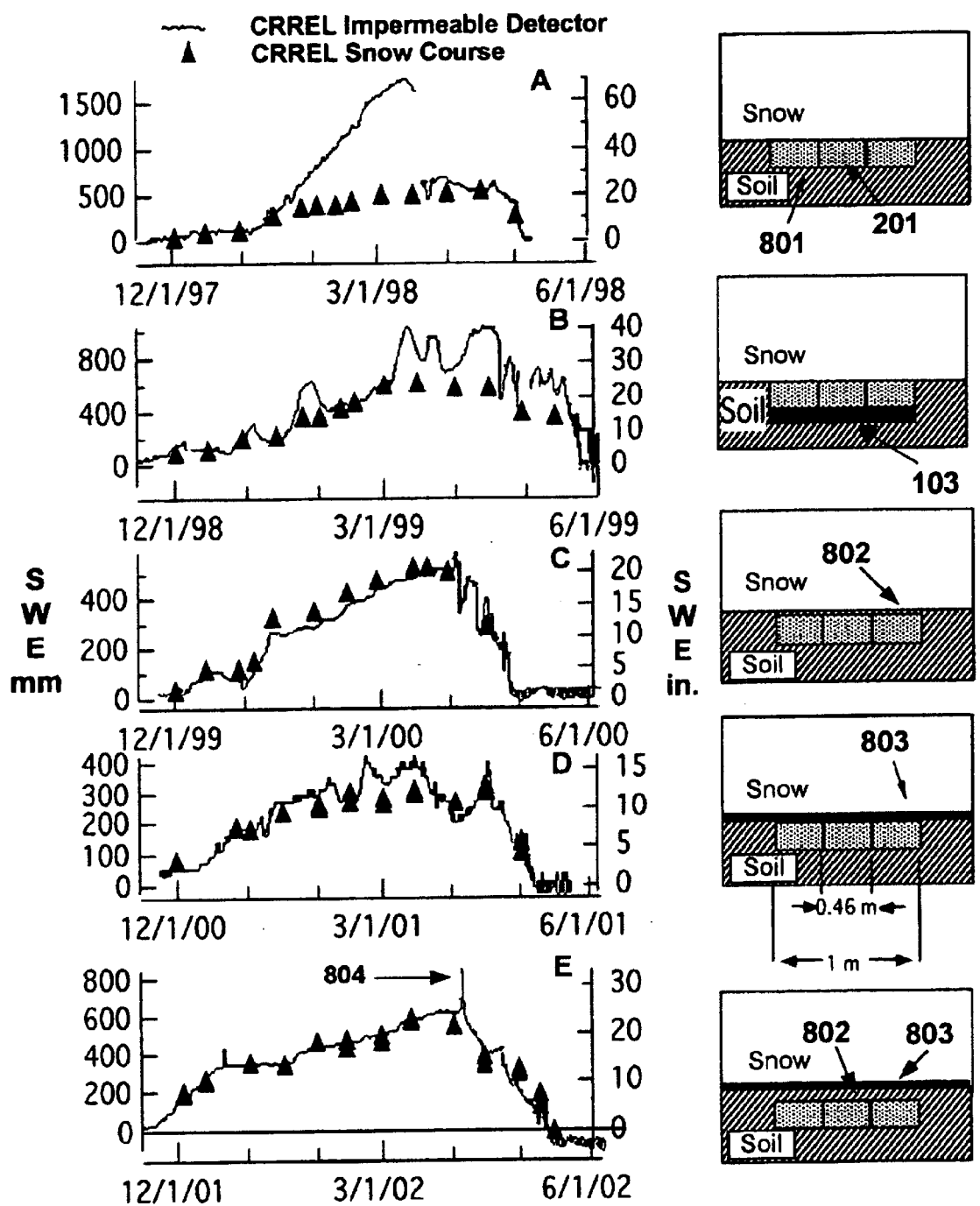
FIG. 8 compares SWE pressure detector measurements taken with the configuration of FIG. 2 to manual SWE measurements, i.e., a Cold Regions Research Engineering Laboratory (CRREL) snow course.

Refer to FIG. 8. The improvements in SWE measurement accuracy that result from matching the thermal properties of the impermeable detector 101 are shown in FIG. 8. The thermal properties of the detector 101 of FIG. 2 were modified for each of the five Winters of '98 through '02. FIG. 8 illustrates the improved performance of a detector 101 as the match between the detector 101 and soil thermal properties is improved. The general test configuration is shown to the right of each of FIGS. 8A, 8B, 8C, 8D, and 8E.

The impermeable detector 101 used to achieve the results of FIG. 8 has a load sensing diameter of 0.46 m (1.5 ft), approximately 2% of the area of a conventional snow pillow. With such a small diameter and no thermal matching between the detector 101 and soil, large measurement errors are expected and are observed in FIG. 8A. As the thermal properties of the detector 101 are matched to the soil using thermal conductivity straps 202 and a layer 103 of heat diffusing material to slow heat conduction, SWE measurement accuracy improves dramatically as shown in FIG. 8B.

Refer to FIG. 8C. Further improvement is attained by adding a thin layer 802 of soil, e.g., <5 cm (2 in.), over the detector 101 to diffuse heat. This increases SWE measurement accuracy as shown in FIG. 8C. Diurnal SWE measurement errors have occurred in spring due to snowmelt water fluctuations that cause the thermal properties and heat flux conditions of the soil around the SWE detector to change as shown in FIG. 8C.

Refer to FIG. 8D representing Winter/Spring '01. An impermeable membrane 803, i.e., a plastic sheet, with a diameter of 2.7 m (9 ft) was placed over the impermeable detector 101. This eliminated the Spring '01 diurnal SWE measurement errors caused by diurnal snowmelt conditions. SWE measurement errors were increased slightly compared to Winter/Spring '00 (FIG. 8C) because the diffusing layer 802 of soil had been removed when the plastic sheet 803 was emplaced, as can be seen in comparing FIG. 8C with FIG. 8D.

Refer to FIG. 8E. The combination of a soil diffusing layer 802 and impermeable membrane 803 eliminated SWE measurement errors during Winter/Spring '02. An SWE error spike 804 occurred as the snowpack warmed to 0° C. causing a sudden increase in the differential rate of melting over the detector 101 and surrounding soil. This spike error 804 may be eliminated by improving the thermal match between the detector 101 and soil, increasing the detector diameter, or increasing the compliance of the detector 101. Detector compliance is defined as the amount of deflection the detector 101 undergoes at a specified force. A low compliance detector 101 exhibits little deflection, e.g., the detectors 101 used to collect data for FIG. 8 are low compliance, having deflections of about 0.003 in. A high compliance detector 101 may have a deflection of 0.1 in.

Figure 9:
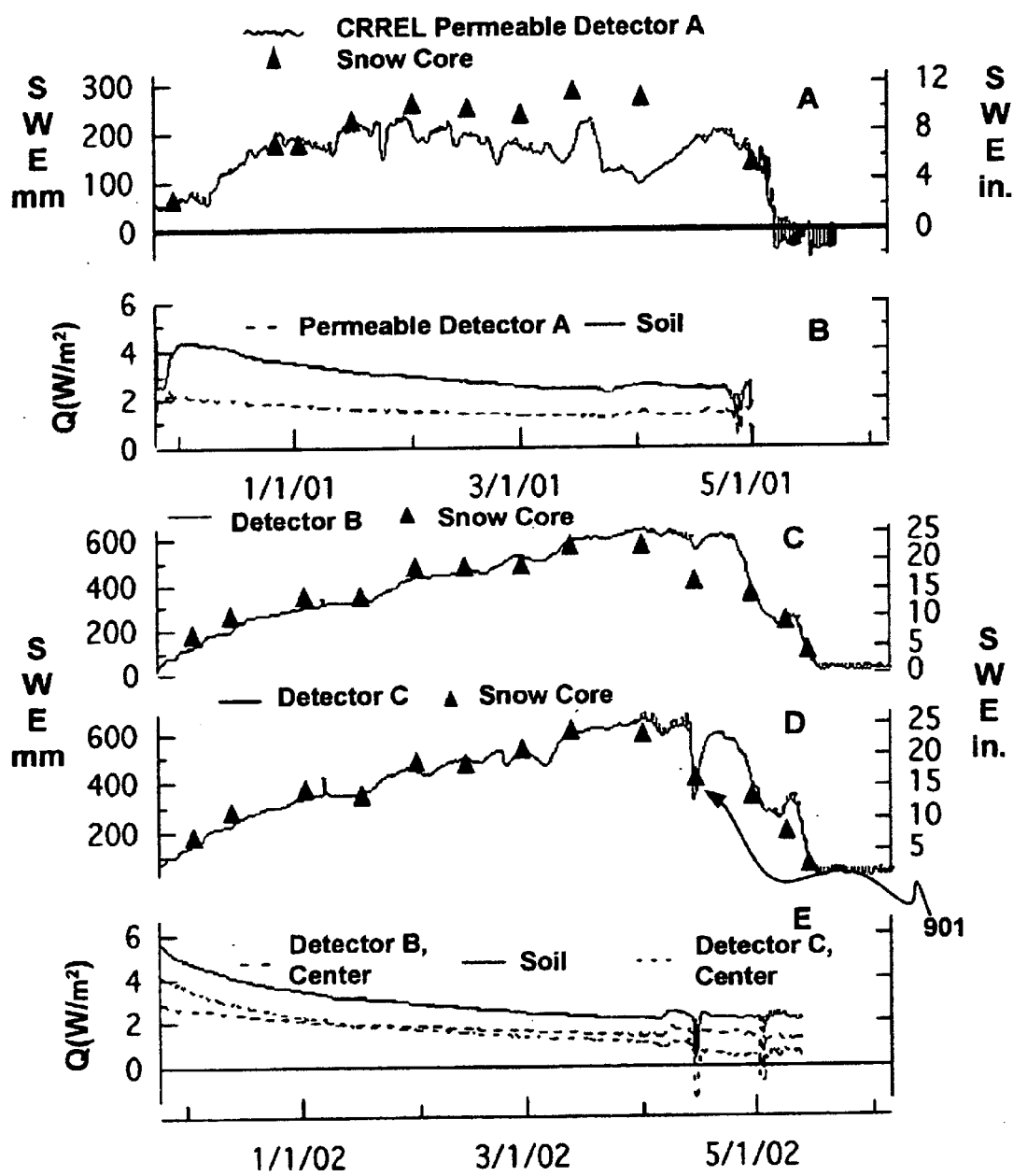
FIG. 9 compares measurements taken with the configurations of FIGS. 3 and 4 to manual SWE measurements.

Refer to FIG. 9 showing performance of detectors A, B, and C. The SWE measurements results for Winter/Spring '01 in FIG. 9A are for detector A, a 1.0 m² perforated (permeable) detector 101 having the configuration of FIGS. 3C and D (2 sensors 301, no flexible heat conducting straps 202). Also shown in FIG. 9B is the differential heat flux, Q, associated with both detector A and the soil adjacent thereto.

FIG. 9C shows results for Winter/Spring '02 from detector B, a 1.0 m² perforated detector 101 having the configuration of FIGS. 4C and D but without the flexible heat conducting straps 202 and with a single central sensor 201, resulting from improving the thermal match from the configuration of detector A to that of detector B.

FIG. 9D shows a comparable performance to detector B for detector C, a 0.55 m² detector 101 of the same configuration as detector B, also tested in Winter/Spring '02. Note how well detector C tracked the spike at 901 representative of an unusual spring warming event. Measurements for the configurations of detectors B and C are not shown for Winter/Spring '01. Comparisons of the heat flux, Q, for detectors B, C, and the soil are shown in FIG. 9E.

Refer to FIGS. 9A and 9C. The improved performance from the configuration of detector A in Winter/Spring '01 to the configuration of detector B in Winter/Spring '02 is due to reducing the thermal conductivity of detector A by removing the inner support structures 204, 205. Allowing water to flow through the detector 101 also improves detector performance as is demonstrated by comparing the results of FIG. 8 using solid, or impermeable, detectors 101, with FIGS. 9C and D. Free water flow through the detector 101 maintains soil moisture under the detector 101 at about the same as the surrounding soil.

EXAMPLE II

Figure 10:
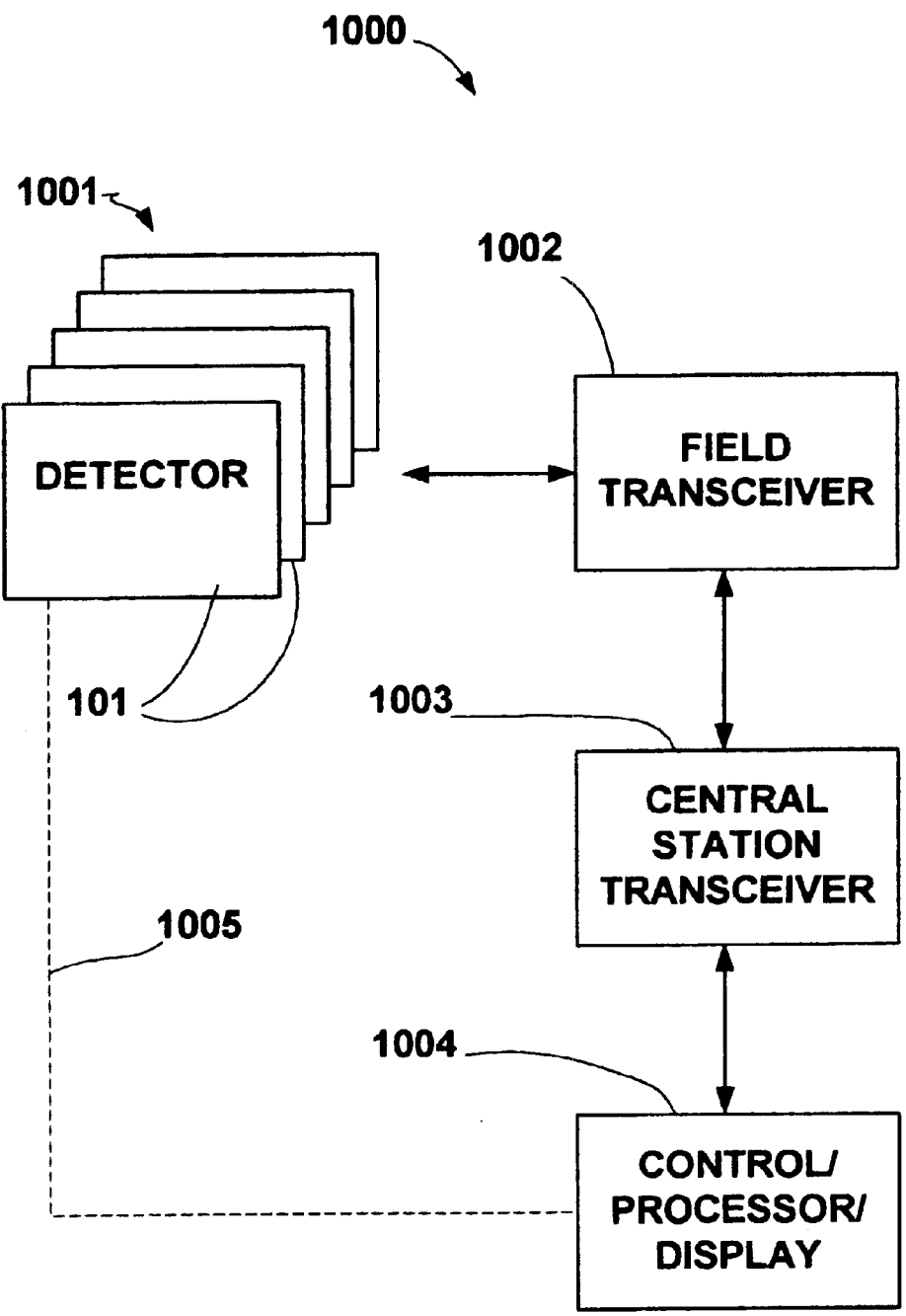
FIG. 10 is a block diagram of a system in accordance with a preferred embodiment of the present invention.

Refer to FIG. 10. Detectors 101 representing a preferred embodiment of the present invention may be integrated into a network 1000 of stations that use conventional displays, processors and control 1004, such as data loggers and conventional transceivers 1002, 1003, such as RF telemetry systems. An array 1001 of these detectors 101 is practical whereas current devices, such as snow pillows, are too expensive and cumbersome to install on slopes or in an array. An array 1001 of detectors 101 tied to telemetry and data loggers, such as those available from Campbell Scientific Co., enables determination of the variation of SWE over an area, including slopes otherwise infeasible to instrument. Additionally, these arrays may provide an accurate estimate of the total SWE in a basin because SWE varies by location and a few measurements may not be representative of a region.

An instrumentation system may consist of an array 1001 of detectors 101 deployed in varying terrain within regions of interest. The detectors 101 may be hardwired 1005 to a central data logging site 1004 for control, processing and display or communicate via a field transceiver 1002 with a central station transceiver 1003 at a collection site via telemetry, for example. Data thus collected are useful for prediction of flood potential, available water supply for domestic, agricultural, and industrial uses, and snow avalanche hazards.

These data may be used for trends analysis by recording it or for near real time analysis and warning. The size of the individual detectors also accommodates calibration of individual detectors, as well as arrays of detectors, in the field.

Although a major portion of the description deals with SWE measurement, embodiments of the invention may be applied to such diverse applications as:

- warning of impending landslides by inserting the system just below the first few inches of top soil in suspect regions;
- planning for construction in areas known to have substrates that vary seasonally or even aperiodically;
- use in conjunction with seismic sensors to detect trends in structural displacement;
- use in manufacturing to detect a change in a manufacturing process that may predict out-of-tolerance operation;
- use in microelectronics and micro-electro-mechanical systems (MEMS) for medical diagnosis and treatment;
- physical safety systems, such as ascertaining thickness of ice in a skating pond; and
- use in any environment in which the size, configuration, or makeup of the instrumentation may influence thermal characteristics of the environment in which data are being taken.

Although specific types of detectors, arrays, and systems are discussed, other similar detectors and systems, including those that may have only some of the constituents used in the above described examples, may be suitable for determining pressure changes using a structure or method that falls within the ambit of a preferred embodiment of the present invention as provided in the claims herein.

What is claimed is:

1. A system that accurately determines relative pressure at a boundary between first and second media, comprising:

at least one detector incorporating structure for mounting and enclosing at least one pressure sensor, wherein at least a portion of said structure is in contact with one media of said first and second media and interposed therebetween, and wherein said structure enhances thermal stability of said detector, and at least one cover, wherein said at least one cover is disposed over said detector so as to be positioned between said detector and the one of said media that does not contact said detector; and wherein said system maintains thermal conductivity comparable to said system's immediately surrounding environs.

2. The system of claim 1 in which said sensor is selected from the group consisting of: load cells, strain gauges, displacement sensors using lasers that measure deflection, displacement sensors using capacitance to measure deflection, and combinations thereof.

3. The system of claim 1 in which said detector exhibits a low aspect ratio such that said detector's thickness is less than about 3% of a longest dimension of said detector.

4. The system of claim 1 in which said structure comprises materials having low specific heat values of less than about 0.1 cal/gm-K at 20° C.

5. The system of claim 4 in which said materials are selected from the group consisting essentially of: aluminum, stainless steel, low specific heat synthetic material, low specific heat plastics, and combinations thereof.

6. The system of claim 1 in which said structure further includes a layer of heat diffusing material internal thereto.

7. The system of claim 6 in which said layer of heat diffusing material is selected from materials consisting essentially of: elastomeric material, metal, polymer foam, a honeycomb configuration fabricated from metal, a honeycomb configuration fabricated from a synthetic material, and combinations thereof.

8. The system of claim 1 in which said cover is selected from the group consisting of a moisture impermeable membrane, a synthetic material, a layer of soil of approximately 5 cm thickness, and combinations of the above.

9. The system of claim 1 in which said structure enables an effective Young's Modulus at least 25% greater than the Young's Modulus of environs immediately surrounding said system.

10. A detector that accurately determines relative pressure at a boundary between first and second media, comprising:

at least one pressure sensor; and structure having a low specific heat for mounting and enclosing said at least one sensor, wherein low specific heat is less than about 0.1 cal/gm-K at 20° C., and wherein at least a portion of said structure is in contact with one media of said first and second media and interposed therebetween, and wherein said structure enhances thermal stability of said detector, and wherein said detector maintains thermal conductivity approximately comparable to said detector's surrounding environs.

11. The detector of claim 10 in which said sensor is selected from the group consisting of: load cells, strain gauges, displacement sensors using lasers to measure deflection, displacement sensors using capacitance to measure deflection, and combinations thereof.

12. The detector of claim 10 in which said detector exhibits a low aspect ratio of less than about 3% of a longest dimension of said detector.

13. The detector of claim 10 in which said structure comprises materials having low specific heat values of less than about 0.1 cal/gm-K at 20° C.

14. The detector of claim 13 in which said materials are selected from the group consisting essentially of: aluminum, stainless steel, low specific heat plastics, and combinations thereof.

15. The detector of claim 10 in which said structure further includes a layer of heat diffusing material internal thereto.

16. The detector of claim 15 in which said layer of heat diffusing material is selected from materials consisting essentially of: metal, a synthetic material, and combinations thereof.

17. The detector of claim 10 in which said cover is selected from the group consisting of a moisture impermeable membrane, a synthetic material, a layer of soil of approximately 5 cm thickness, and combinations of the above.

18. The detector of claim 10 in which said structure enables an effective Young's Modulus at least 25% greater than the Young's Modulus of environs immediately surrounding said detector.

19. A monitoring system that provides accurate estimates of relative pressure from data collected at a boundary of first and second media, comprising:
   at least one detector incorporating structure for mounting and enclosing at least one pressure sensor,
wherein at least a portion of said structure is in contact with one media of said first and second media and interposed therebetween, and
wherein said structure enhances thermal stability of said detector;
   at least one cover,
wherein said at least one cover is disposed over said structure of said sensors so as to be positioned between said structure and the one of said media that does not contact said structure;
   at least one data transceiver associated with at least one said detectors for communicating said data and receiving information;
   at least one data collector in operable communication with said transceivers for receiving said data; and
   at least one processor in operable communication with at least said collectors for manipulating and displaying said data,
wherein said monitoring system maintains thermal conductivity at said boundary comparable to said system's surrounding environs at said boundary.

20. A system that reduces error in measuring the pressure created by the mass of a first medium contacting a second medium, comprising:
   at least one pressure sensor;
   structure that at least incorporates said sensors and supports said sensors upon said second medium;
wherein said structure comprises at least one material that permits at least part of said system to approximate the thermal conductivity of said second medium, and
wherein said structure is configured to approximately match the moisture content of said second medium to the moisture content of said structure; and
   at least one cover that separates at least part of said system from said first medium,
wherein at least part of said error is introduced by differences in thermal conductivity between conventionally configured systems for measuring pressure and said second medium.

21. The system of claim 20 in which said first medium is snow and said second medium is soil,
wherein said system at least enables establishing accurate estimates of snow water equivalent.

22. The system of claim 20 in which said sensors are selected from the group consisting of: load cells, strain gauges, displacement sensors using lasers to measure deflection, displacement sensors using capacitance to measure deflection, linear variable transducers, ultrasonic distance rangers, laser distance rangers, and combinations thereof.

23. The system of claim 20 in which said structure is segmented.

24. The system of claim 20 in which the thickness of said structure is less than about three percent of a longest dimension of said structure.

25. The system of claim 20 in which said structure comprises at least some material having a specific heat value of less than about 0.1 cal/gm-K at 20° C.

26. The system of claim 25 in which said material is selected from the group consisting essentially of: aluminum, stainless steel, plastics, and combinations thereof.

27. The system of claim 20 in which said structure comprises:
   a top;
   a bottom;
   at least one member in operable communication with both said top and said bottom such that said member separates said top from said bottom,
wherein space exists for said sensors to be located between said top and said bottom; and
   heat diffusing material located between said top and said bottom.

28. The system of claim 27 in which said top and said bottom are permeable to moisture.

29. The system of claim 28 in which said covers are selected from the group consisting of a membrane permeable to moisture, a synthetic material permeable to moisture, a layer of soil of approximately 5 cm thickness, and combinations of the above.

30. The system of claim 27 in which said heat diffusing material is selected from materials consisting essentially of: elastomeric material, metal, synthetic material, polymer foam, a honeycomb configuration fabricated from metal, a honeycomb configuration fabricated from a synthetic material, springs, and combinations thereof.

31. The system of claim 27 in which said members support said structure on the periphery of said structure.

32. The system of claim 20 which said covers are impermeable to moisture and said structure seals said sensors within said structure, said system further comprising a pressure relief tube in operable communication with said sensors and the outside of said structure.

33. The system of claim 20 having an effective Young's Modulus at least about twenty-five percent greater than the Young's Modulus of said second medium.

34. The system of claim 20 in which said sensors are centrally located in said structure.

35. The system of claim 20 in which said sensors comprise a first sensor centrally located within said structure and at least one second sensor located on the periphery of said structure.

36. The system of claim 20 in which said structure further comprises at least one heat-conducting strap.

37. The system of claim 20 in which the longest dimension of said cover is about three times the longest dimension of said structure.

38. The system of claim 20 further comprising:
   at least one data transceiver for communicating data from said sensors and receiving information at said sensors, said transceivers in operable communication with said sensors;

at least one data collector for receiving said data, said collectors in operable communication with at least said transceivers; and at least one processor for manipulating and displaying said data, said processors in operable communication with at least said collectors, wherein output of said processors enables monitoring of at least said pressure created by said first medium contacting said second medium.

39. The system of claim 20 in which said structure is of a thickness of about 2.5 cm.

\* \* \* \* \*